United States Patent [19]

Obara

[11] Patent Number: 4,760,233
[45] Date of Patent: Jul. 26, 1988

[54] DRILLING CONFIRMING APPARATUS OF ELECTRIC DISCHARGE MACHINING SYSTEM

[75] Inventor: Haruki Obara, Sagamihara, Japan

[73] Assignee: Fanuc Ltd, Minamitsuru, Japan

[21] Appl. No.: 10,166

[22] PCT Filed: May 29, 1986

[86] PCT No.: PCT/JP86/00270
§ 371 Date: Mar. 12, 1987
§ 102(e) Date: Mar. 12, 1987

[87] PCT Pub. No.: WO86/06995
PCT Pub. Date: Dec. 4, 1986

[30] Foreign Application Priority Data

May 30, 1985 [JP] Japan .................. 60-115219

[51] Int. Cl.$^4$ .................. B23H 1/02; B23H 9/14
[52] U.S. Cl. .................. 219/69 G; 219/69 M
[58] Field of Search .................. 219/69 D, 69 C, 69 G, 219/69 M

[56] References Cited

U.S. PATENT DOCUMENTS 4,146,770  3/1979  Dinsdale et al. .................. 219/69 C
4,415,791  11/1983  Yamada et al. .................. 219/69 G

FOREIGN PATENT DOCUMENTS 50-49797  5/1975  Japan .
57-21227  2/1982  Japan .

Primary Examiner—Philip H. Leung
Assistant Examiner—Geoffrey S. Evans
Attorney, Agent, or Firm—Staas & Halsey

[57] ABSTRACT

A drilling confirmation apparatus for an electric discharge machining system automatically, correctly and easily detects the completion of drilling of a hole through a workpiece. A voltage representing a current flowing across a current limiting resistor of the electric discharge machining system is supplied to a divider through a smoothing differential amplifier, representing a detected average machining current. The frequency of a command pulse supplied from a numerical control unit to a servo circuit is converted into a corresponding voltage through a frequency-to-voltage converter. The converted voltage is supplied to the divider as a detected machining speed. The divider divides the detected machining current by the detected machining speed to obtain a machining area signal. The machining area signal and a delayed machining area signal, which is obtained by delaying the machining area signal by a predetermined period of time, are supplied to a comparator. When the delayed machining area signal exceeds the machining area signal, completion of drilling is detected.

4 Claims, 2 Drawing Sheets

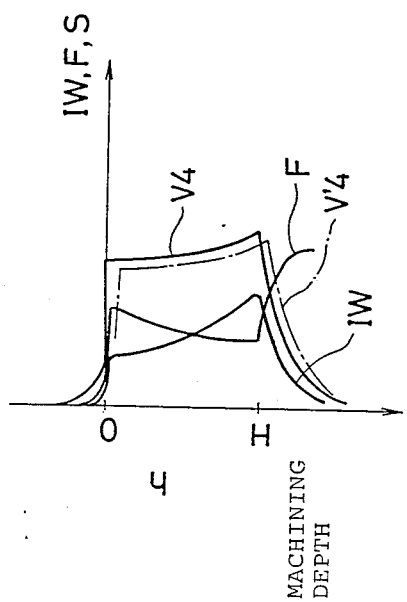
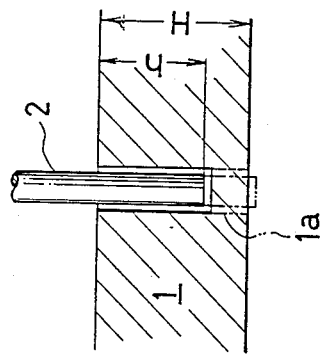

DRILLING CONFIRMING APPARATUS OF ELECTRIC DISCHARGE MACHINING SYSTEM

BACKGROUND OF THE INVENTION

1. Field of the Invention

The present invention relates to an electric discharge machining system.

2. Description of the Related Art

When performing a drilling operation using an electric discharge machining system, it has not heretofore been possible to automatically determine whether or not a hole have been formed. Operator experience or visual detection has been required to determine the completion of a hole.

SUMMARY OF THE INVENTION

It is an object of the present invention to provide a drilling confirmation apparatus for an electric discharge machining system which can automatically, correctly, and easily detect when drilling of a hole through a workpiece has been completed.

In order to achieve the above object, the drilling confirmation apparatus of the present invention comprises average machining current detecting means for detecting an average machining current between a workpiece and an electrode, machining speed detecting means for detecting a machining speed, operational means for dividing the detected average machining current by the detected machining speed and outputting the division result, and drilling detecting means for detecting a decrease in output signal value from the operational means.

As described above, according to the present invention, the average machining current between a workpiece and an electrode is divided by a detected machining speed, i.e., a relative feed speed between the workpiece and the electrode, to obtain a signal corresponding to a machining area. Completion of drilling is detected when the signal corresponding to the machining area decreases. Therefore, completion of machining of a hole through a workpiece can be correctly, easily, and automatically detected.

BRIEF DESCRIPTION OF THE DRAWINGS

FIG. 2 is a cross-sectional view showing an electrode of a wire discharge machining apparatus machining a hole through a workpiece; and FIG. 3 is a graph illustrating respective changes in average machining current, machining speed, signal corresponding to a machining area and a delay signal in the embodiment with respect to a machining depth.

DETAILED DESCRIPTION OF THE PREFERRED EMBODIMENTS

Figure 1:
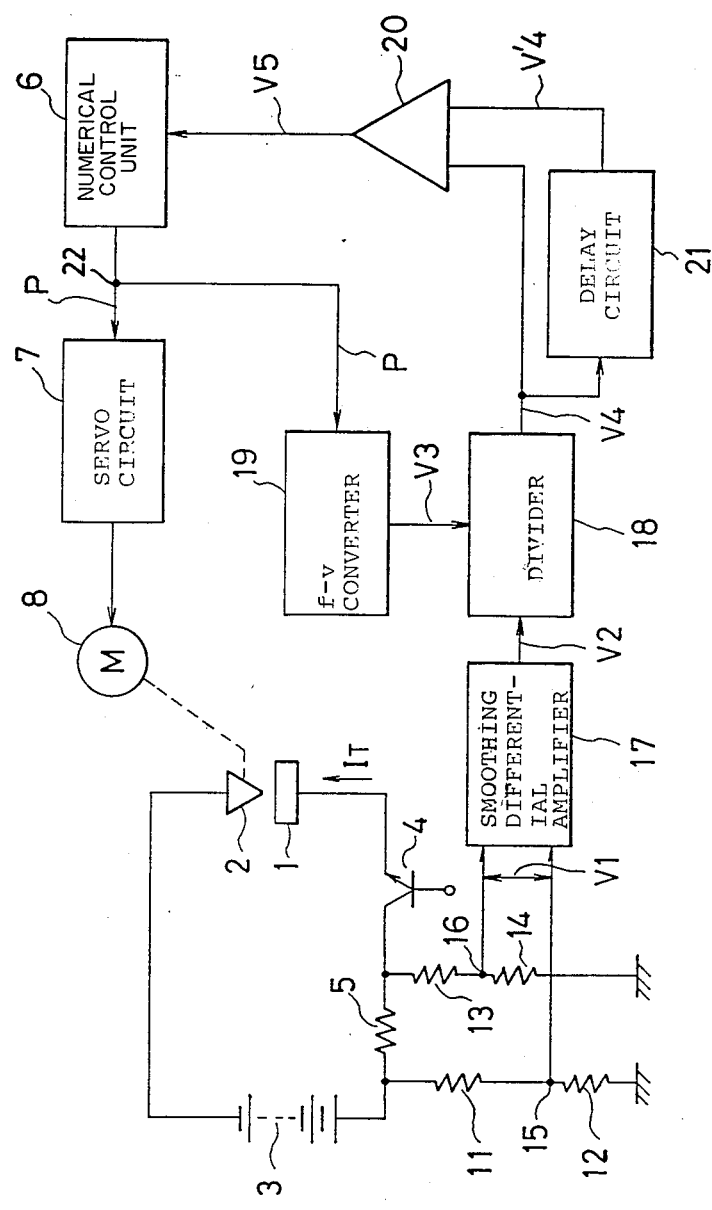
FIG. 1 is a block diagram of a drilling confirmation apparatus according to an embodiment of the present invention.

FIG. 1 illustrates a drilling confirmation apparatus of an electric discharge machining system according to an embodiment of the present invention. In this embodiment, electric discharge drilling is performed by applying a machining voltage between a workpiece 1 and a drilling electrode 2. A DC power source 3 supplies the machining voltage via a current limiting resistor 5 and a transistor 4. The transistor 4 acts as a switching element which is turned on/off by a controller (not shown).

Prior to the explanation on the arrangement of the main portion of the apparatus of the present invention, the operational principle of the present invention will be briefly described. The value of a signal representing an electric discharge machining area S abruptly decreases from a specified value during machining to zero when electric discharge drilling is completed. The present invention is based on this fact. According to the present invention, drilling is deemed to have been completed when an abrupt decrease in the machining area S is detected. More specifically, a change in the machining area S during machining is monitored by utilizing a conventionally known relationship, $S = K \cdot IT/F$ (K is a constant), where S is the machining area, F is the machining speed, and IT is the machining current. Monitoring of the value of S will thereby detect the completion of drilling.

The main portion of the apparatus of the present invention will be described with reference to FIG. 1. One end of a resistor 11 and one end of another resistor 13 are connected to two ends of the current limiting resistor 5. The resistors 11 and 13 are connected in series with resistors 12 and 14, respectively. These resistors 11–14 detect a voltage V1 between nodes 15 and 16, which corresponds to the current flowing across the current limiting resistor 5. The voltage V1 represents the pulse-like machining current IT flowing between the workpiece 1 and the electrode 2. A smoothing differential amplifier 17 for smoothing the voltage V1 is connected to the resistors 11–14. The smoothing differential amplifier 17 outputs a voltage V2 representing an average machining current IW (FIG. 3), which represents an average value of the machining current IT. The resistors 11–14 and the smoothing differential amplifier 17 constitute an average machining current detecting means.

Meanwhile, a frequency-voltage converter (to be referred to as an f-v converter hereinafter) 19 functions as a machining speed detecting means. The f-v converter 19 is connected to the output of a numerical control (NC) unit 6 at a node 22. The f-v converter 19 converts a command pulse P from the NC unit 6, which has a frequency that corresponds to the machining speed F (FIG. 3), into a voltage V3 representing the machining speed F. The output of the f-v converter 19 is supplied to a divider 18. The divider 18 functions as a machining area calculating means, and divides the output voltage (average machining current) V2 supplied from the smoothing differential amplifier 17 by the output voltage (machining speed) V3 supplied from the f-v converter 19, thus obtaining a machining area signal V4. The signal V4 is supplied to both one input terminal of a comparator 20 and to a delay circuit 21 that is provided between the divider 18 and the comparator 20. The signal V4 supplied to the delay circuit 21 is delayed by a predetermined period of time and supplied to the other input terminal of the comparator 20 as a delay signal V'4. The comparator 20 compares the signal V4 corresponding to the machining area with the delay signal V'4. When the delay signal V'4 exceeds the signal V4, the comparator 20 outputs a drilling completion signal V5 to the NC unit 6. In this manner, the comparator 20 together with the delay circuit 21 constitutes a drilling detecting means.

The operation of this embodiment of the present invention will now be described with reference to FIGS. 2 and 3. Note that in FIG. 2 reference symbol H indicates the length of a hole (the thickness of the workpiece 1) and in FIG. 3 the hole length H is plotted along the axis of ordinate and the average machining current IW, the machining speed F, and the machining area signal V4 are plotted along the axis of abscissa. The NC unit 6 drives a servo motor M through the servo circuit 7 (FIG. 1) to move the workpiece 1 and the drilling electrode 2 relative to each other, thus performing drilling. During drilling, the average machining current IW and the machining speed (the feed speed of the electrode 2) F change with respect to the machining depth h as shown in FIG. 3, for instance. The voltage V2, which representing the average machining current IW and changes as shown in FIG. 3, is constantly monitored by the smoothing differential amplifier 17 through the resistors 5 and 11–14. On the other hand, the command pulse P, which has a frequency corresponding to the machining speed F and is supplied from the NC unit 6 to the servo circuit 7, is also supplied to the f-v converter 19. The command pulse P is converted by the converter 19 into the voltage V3. The machining speed F is thus constantly monitored. A ratio $V2/V3$ ($=V4$) proportional to the machining area S is constantly calculated by the divider 18. As a result, the machining area signal V4, which is output from the divider 18, changes with respect to the machining depth h as shown in FIG. 3. The value of the signal V4 gradually increases from its value at the start of drilling as drilling progresses, while the average machining current IW and the machining speed F gradually increases and decreases, respectively, upon the progress of the machining. The signal V4 abruptly decreases immediately after the completion of the drilling, as the average machining current IW and the machining speed F abruptly decreases and increases, respectively.

In this manner, the change in machining area signal V4 is constantly monitored by the comparator 20. In other words, the comparator 20 compares the present value of the machining area signal V4, which is supplied from the divider 18, with the present value of the delay signal V'4, which is supplied from the delay circuit 21 and corresponds to the signal V4 which is prior to the present time point by a predetermined period of time. The comparator 20 thus discriminates the increase/decrease in machining area signal V4. From the start of the drilling operation until immediately before the completion of drilling, since the machining area signal V4 gradually increases to constantly exceed the delay signal V'4, the output from the comparator 20 is at low level. However, when drilling is completed and the delay signal V'4 exceeds the machining area signal V4, the comparator 20 outputs a high-level drilling completion signal V5 to the NC unit 6. In response to the signal V5, the NC unit 6 stops the supply of the command pulse P, renders a control circuit (not shown) inoperative, and stops electric discharge and the drilling procedure.

In this embodiment, the comparator 20 compares the machining area signal V4 with its delay signal V'4. However, the embodiment may be modified so that the non-delayed machining area signal V4 is shifted in level by a predetermined positive value and the thus level-shifted signal is compared with the non-level-shifted delay signal V'4. According to this modification, even when the machining area signal V4 varies during drilling, completion of drilling can be detected in response to only an abrupt decrease in machining area signal V4 at the time of drilling completion.

This embodiment can also be modified in the following manner. The output (detected average machining current IW) from the average differential amplifier 17 is A/D-converted and is input to the NC unit 6. Then, a machining area signal and a drilling completion signal can be obtained in a software manner by a microcomputer in the NC unit 6 based on the average machining current input to the NC unit 6 and the feed speed output from the NC unit 6.

I claim:

1. A drilling confirmation apparatus for an electric discharge machining system, comprising:
   average machining current detecting means for detecting an average machining current between a workpiece and an electrode;
   machining speed detecting means for detecting a machining speed;
   operational means for dividing the detected average machining current by the detected machining speed and outputting the resulting division value in an output signal; and
   drilling detecting means for detecting an abrupt decrease in the value of the output signal from the operational means, which indicates completion of a hole drilling operation.

2. An apparatus according to claim 1, wherein said drilling detecting means includes a delay circuit connected to an ouput of said operational means for delaying the output signal and comparing means for comparing the value of the output signal directly from said operational means and the value of the delayed output signal from said delay circuit and outputting a drilling completion signal when the value of the delayed output signal exceeds the value of the output signal.

3. A drilling confirmation apparatus according to claim 1, wherein said average machining current detecting means include a plurality of resistors for detecting a first voltage corresponding to a current being used for electric discharge machining and a smoothing differential amplifier for producing a second voltage corresponding to the average machining current,
   said machining detecting means include a frequency-to-voltage converter for converting a command pulse having a frequency corresponding to the machining speed to a voltage corresponding to the machining speed,
   said operational means includes a divider for dividing the second voltage by the third voltage to yield a fourth voltage representing a machining area.

4. A method for confirming the completion of a drilling operation through a workpiece using electric discharge machining, said method comprising:
   detecting an average machining current between a workpiece and an electrode;
   detecting a machining speed of the electric discharge machining;
   dividing the detected average machining current by the detected machining speed to yield a machining area signal;
   delaying the machining area signal;
   comparing the machining area signal and the delayed machining area signal; and
   outputting a drilling completion signal when the delayed machining area signal exceeds the machining area signal.

* * * * *